(12) United States Patent
Ohtani et al.

(10) Patent No.: US 11,369,946 B2
(45) Date of Patent: Jun. 28, 2022

(54) RECOVERY OF ADSORPTION CAPACITY OF BEADED ACTIVATED CARBON USING GAS-PHASE ORGANIC SOLVENTS

(71) Applicants: Ford Global Technologies, LLC, Dearborn, MI (US); The Regents of the University of Michigan, Ann Arbor, MI (US)

(72) Inventors: Hiroko Ohtani, Dearborn Heights, MI (US); Kevin Richard John Ellwood, Ann Arbor, MI (US); Maithri Venkat, West Bloomfield, MI (US); Adarsh Bhat, Ann Arbor, MI (US); Johannes Schwank, Ann Arbor, MI (US)

(73) Assignees: Ford Global Technologies, LLC, Dearborn, MI (US); The Regents of the University of Michigan, Ann Arbor, MI (US)

(*) Notice: Subject to any disclaimer, the term of this patent is extended or adjusted under 35 U.S.C. 154(b) by 474 days.

(21) Appl. No.: 16/569,914

(22) Filed: Sep. 13, 2019

(65) Prior Publication Data

US 2020/0086298 A1 Mar. 19, 2020

Related U.S. Application Data

(60) Provisional application No. 62/730,841, filed on Sep. 13, 2018.

(51) Int. Cl.
 *B01J 20/34* (2006.01)
 *B01D 53/08* (2006.01)
 *B01J 20/20* (2006.01)

(52) U.S. Cl.
 CPC .......... *B01J 20/3458* (2013.01); *B01D 53/08* (2013.01); *B01J 20/20* (2013.01); *B01J 20/3416* (2013.01);

(Continued)

(58) Field of Classification Search
 CPC .... B01J 20/3458; B01J 20/20; B01J 20/3416; B01D 53/08; B01D 2253/102; B01D 2257/708; B01D 2259/4009

(Continued)

(56) References Cited

U.S. PATENT DOCUMENTS 3,720,626 A  3/1973 Benzaria et al.
4,861,484 A  8/1989 Lichtin et al.
(Continued)

FOREIGN PATENT DOCUMENTS

CN  104857940  8/2015
CN  105457617  4/2016
(Continued)

OTHER PUBLICATIONS

CN-206240266-U English Translation (Year: 2017).*

(Continued)

*Primary Examiner* — Anita Nassiri-Motlagh
(74) *Attorney, Agent, or Firm* — Burris Law, PLLC (57) ABSTRACT

Methods for desorbing volatile organic compounds (VOCs) from beaded activated carbon (BAC) that is loaded with VOCs, during the VOC abatement process using the fluidized carbon bead system include transferring the loaded BAC in an adsorber to a desorber, where a stream of organic solvent passes over the BAC to dissolve at least a portion of the adsorbed VOCs into the organic solvent to regenerate BAC. The regenerated BAC is returned to the adsorber. The organic solvent containing dissolved VOCs may be transferred to a distiller to separate the organic solvents from the dissolved VOCs and may be reused as the organic solvent in the desorber.

20 Claims, 3 Drawing Sheets

$P_0$ represents the saturation pressure of $N_2$ at liquid $N_2$ temperature (52) U.S. Cl.
CPC .. *B01D 2253/102* (2013.01); *B01D 2257/708* (2013.01); *B01D 2259/4009* (2013.01)

(58) Field of Classification Search
USPC .......................................................... 502/34
See application file for complete search history.

(56) References Cited

U.S. PATENT DOCUMENTS

| | | | |
|---|---|---|---|
| 6,013,593 | A | 1/2000 | Lee et al. |
| 2008/0286193 | A1 | 11/2008 | Bento et al. |

FOREIGN PATENT DOCUMENTS

| | | | |
|---|---|---|---|
| CN | 206240266 U | * | 6/2017 |
| JP | H05269338 | | 10/1993 |

OTHER PUBLICATIONS

Walker, Literature Review: Adsorption and Desorption of Mixtures of Organic Vapors on Beaded Activated Carbon, Oct. 2012.

Lashaki et al., The role of beaded activated carbon's pore size distribution on heel formation during cyclic adsorption/desorption of organic vapors, Journal of Hazardous Materials, vol. 315, pp. 42-51, ScienceDirect, Elsevier Publishing, 2016.

Lashaki et al., Effect of Adsorption and Regeneration Temperature on Irreversible Adsorption of Organic Vapors on Beaded Activated Carbon, Environmental Science and Technology, vol. 46(7), pp. 4083-4090, Mar. 2012.

Sanchez-Montero et al., Supercritical Regeneration of an Activated Carbon Fiber Exhausted with Phenol, Journal of Applied Sciences, vol. 8, pp. 1-14, MDPI, Switzerland, 2018.

TKS Industrial Company, VOC Abatement Systems, Fluidized Bed Carbon VOC Abatement, Product Sheet, Sep. 2014.

Cross et al., Abstract, Organic solvent regeneration of granular activated carbon, SAO/NASA ADS Physics Abstract Service. 1982.

Fayaz et al, Abstract, Using Microwave Heating To Improve the Desorption Efficiency of High Molecular Weight VOC from Beaded Activated Carbon, Environmental Science & Technology, vol. 49 (7), American Chemical Society, 2015.

* cited by examiner

RECOVERY OF ADSORPTION CAPACITY OF BEADED ACTIVATED CARBON USING GAS-PHASE ORGANIC SOLVENTS

CROSS-REFERENCE TO RELATED APPLICATIONS

This application claims priority to U.S. Provisional Application No. 62/730,841, filed on Sep. 13, 2018. The disclosure of the above application is incorporated herein by reference.

FIELD

The present disclosure relates to organic-solvent-based regeneration processes for beaded activated carbon ("BAC" or "BACs") loaded with volatile organic compounds ("VOC or VOCs").

BACKGROUND

The statements in this section merely provide background information related to the present disclosure and may not constitute prior art.

In many large-scale paint processes, including vehicle paint processes, an object to be painted, in whole or in part, is subjected to a series of spray-painting and baking operations, which produce VOCs. Solvent-based paints contain organic molecules in the formulation to dissolve or disperse different components. In the aforementioned painting processes, VOCs originating from the paint solvents are emitted to the air, which is undesirable.

Figure 1:
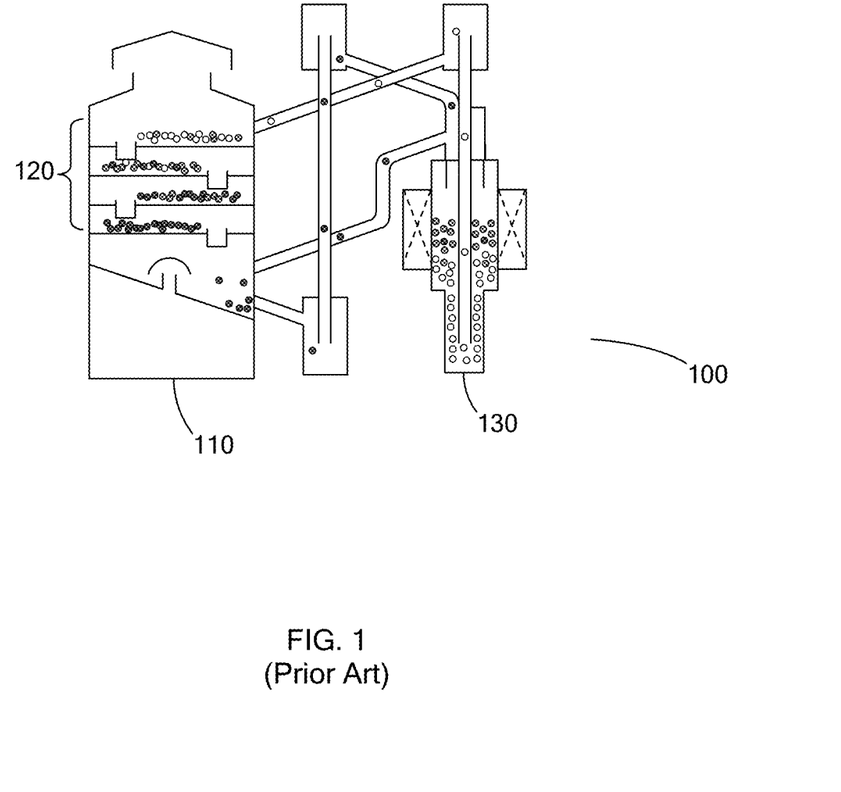
FIG. 1 is a diagrammatic view of a conventional fluidized carbon bead system according to the prior art.

One of the methods to capture the VOCs produced during the painting operation is by using a fluidized carbon bead system ("FCBS") also known as a paint emission concentrator. Referring to FIG. 1, an exemplary FCBS 100 is shown. FCBS 100 includes an adsorber unit 110, into which VOC-laden air enters. Adsorber unit 110 includes an adsorption bed 120 filled with beaded activated carbon. VOC laden air passes through a fluidized adsorption bed 120 where highly porous BAC is used as an adsorbent. VOCs are adsorbed by the BAC via physisorption, chemisorption, and condensation. To desorb the adsorbed VOCs, BAC is transferred from adsorber unit 110 to desorption unit 130. Desorption unit 130 thermally desorbs accumulated VOCs from BAC by heating to a temperature of less than or equal to about 540° C. in nitrogen environment. BACs that have been thermally treated in desorption unit 130 are returned to adsorber unit 110 to be used again in the adsorption bed 120.

These issues related to regeneration of BACs, among other issues related to VOC mitigation, are addressed by the current disclosure.

SUMMARY

According to one form of the present disclosure, a method of treating beaded steam-activated carbon loaded (where the term "loaded" is intended to refer to herein as steam-activated carbon that has lost at least a portion of its adsorption capacity due to the presence or accumulation of VOCs in its micropores during periodic cycles of adsorption-desorption operation) with VOCs of a FCBS with an organic solvent includes passing a vapor-phase stream of the organic solvent comprising a carrier gas and the organic solvent over VOC-loaded, beaded steam-activated carbon to extract at least a portion of the VOC from the beaded steam-activated carbon to regenerate the beaded steam-activated carbon. The organic solvent and VOCs are condensed out of the carrier gas of the vapor-phase steam of the organic solvent to separate the carrier gas from the organic solvent and the VOCs. The VOCs are distilled to separate the organic solvent and the VOCs. The regenerated beaded steam-activated carbon are transferred to an adsorber.

According to a variation of this method, the organic solvent is selected from the group consisting of dimethyl sulfoxide, acetonitrile, acetone, dimethyl formamide, carbon disulfide, tetrahydrofuran, and ethyl glycol.

According to another variation, the organic solvent is dimethyl sulfoxide.

According to yet another variation, the regenerated beaded steam-activated carbon exhibits a capacity of greater than or equal to about 70% of the capacity of virgin beaded steam-activated carbon.

According to a further variation, the organic solvent is a vapor-phase stream of organic solvent comprising a mixture comprising the vapor-phase stream of organic solvent and a carrier gas. According to yet other such further variations, the carrier gas comprises nitrogen gas.

According to an even further variation, the organic solvent is recovered from a distillation unit and introduced into a desorber for reuse.

According to another form of the present disclosure, a method of treating steam-activated carbon loaded with VOCs of a FCBS with an organic solvent includes passing a vapor-phase stream of the organic solvent comprising a carrier gas and the organic solvent over VOC-loaded, steam-activated carbon to extract at least a portion of the VOC from the steam-activated carbon to regenerate the steam-activated carbon. The organic solvent and VOCs are condensed out of the carrier gas of the vapor-phase steam of the organic solvent to separate the carrier gas from the organic solvent and the VOCs. The VOCs are distilled to separate the organic solvent and the VOCs. The regenerated steam-activated carbon are transferred to an adsorber.

According to a variation of this method, the organic solvent is selected from the group consisting of dimethyl sulfoxide, acetonitrile, acetone, dimethyl formamide, carbon disulfide, tetrahydrofuran, and ethyl glycol.

According to another variation, the organic solvent is dimethyl sulfoxide.

According to yet another variation, the steam-activated carbon is selected from at least one of the group consisting of beaded steam-activated carbon, pellet-shaped steam-activated carbon, and extrudates of steam-activated carbon.

According to a further variation, the regenerated steam-activated carbon exhibits a capacity of greater than or equal to about 70% of the capacity of virgin beaded steam-activated carbon.

According to a yet further variation, the organic solvent is a vapor-phase stream of organic solvent comprising a mixture comprising the vapor-phase stream of organic solvent and a carrier gas. According to yet other such further variations, the carrier gas comprises nitrogen gas.

According to an even further variation, the organic solvent is recovered from a distillation unit and introduced into a desorber for reuse.

According to another form of the present disclosure, a method of treating beaded steam-activated carbon loaded with VOCs of a FCBS with dimethyl sulfoxide includes passing a vapor-phase stream of the dimethyl sulfoxide comprising a carrier gas and the dimethyl sulfoxide over VOC-loaded, beaded steam-activated carbon to extract at least a portion of the VOC from the beaded steam-activated carbon to regenerate the beaded steam-activated carbon. The dimethyl sulfoxide and VOCs are condensed out of the carrier gas of the vapor-phase steam of the dimethyl sulfoxide to separate the carrier gas from the dimethyl sulfoxide and the VOCs. The VOCs are distilled to separate the dimethyl sulfoxide and the VOCs. The regenerated beaded steam-activated carbon are transferred to an adsorber.

According to a variation of this method, the regenerated steam-activated carbon exhibits a capacity of greater than or equal to about 70% of the capacity of virgin beaded steam-activated carbon.

According to another variation, the dimethyl sulfoxide is a vapor-phase stream of dimethyl sulfoxide comprising a mixture comprising the vapor-phase stream of dimethyl sulfoxide and a carrier gas. According to yet other such variations, the carrier gas comprises nitrogen gas.

According to a further variation, the dimethyl sulfoxide is recovered from a distillation unit and introduced into a desorber for reuse.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A process for regenerating BAC is disclosed. The process disclosed herein results in less painting operation downtime, as the BAC does not need to be transferred off-site as may be required under conventional processes. Moreover, the disclosed regeneration processes may be conducted at substantially lower temperatures than in conventional regeneration processes in a desorber unit, thereby providing substantial energy and cost savings. Further, under traditional destructive BAC regeneration process in a rotary kiln, the entire batch of BAC must be heated to greater than or equal to about 870° C., which, given the high heat capacity of BAC, is a substantial investment of energy not required according to the present disclosure.

According to a variation, the BAC may be supplied in diameters ranging from greater than or equal to about 0.35 mm to less than or equal to about 0.8 mm. According to another variation, other shapes of activated carbon may be suitable under the present disclosure where the activated carbon are steam activated, i.e., carbon is activated in a steam atmosphere at a temperature of greater than 250° C. Steam-activated BACs are also contemplated under the present disclosure. Pellet-shaped steam-activated carbon and extrudates of steam-activated carbon are also contemplated according of the teachings of the present disclosure.

Laboratory scale and comparative examples of the present disclosure follow, using the aged BAC (i.e., BAC that amass so much heel accumulation as to render them unsuitable for further VOC adsorption) produced by the full-scale FCBS.

Example 1

A carrier gas comprising nitrogen from a nitrogen storage tank was fed to a bubbler containing an organic solvent comprising dimethyl sulfoxide to form a nitrogen-dimethyl sulfoxide vapor mixture. The flow rate of the carrier gas was maintained constant at 200 sccm using a mass flow controller. The nitrogen-dimethyl sulfoxide vapor mixture was then fed to the top of a glass-tube adsorption column packed with a bed of 2 g of aged BAC loaded with VOCs, having a critical diameter, Dc, of 1.27 cm and a critical height, Hc, of 5.08 cm bed for 12 hours, during which time the regeneration column resided within a vertical furnace which maintained a constant temperature of 290° C. The BAC was removed from the packed bed regeneration column thereafter and the surface area of the BAC was measured using a Micromeritics® ASAP™ 2020 apparatus, commercially available from Micromeritics Instrument Corporation. The regenerated BAC was then degassed for 24 hours under vacuum at 350° C. and nitrogen physisorption and desorption were carried out at 77 K.

Example 2

A carrier gas comprising nitrogen from a nitrogen storage tank was fed to a bubbler containing an organic solvent comprising acetonitrile to form a nitrogen-acetonitrile vapor mixture. The flow rate of the carrier gas was maintained constant at 200 sccm using a mass flow controller. The nitrogen-acetonitrile vapor mixture was then fed to the top of a glass-tube adsorption column packed with a bed of 2 g of aged BAC loaded with VOCs, having a critical diameter, Dc, of 1.27 cm and a critical height, Hc, of 5.08 cm bed for 12 hours, during which time the regeneration column resided within a vertical furnace which maintained a constant temperature of 290° C. The BAC was removed from the packed bed column thereafter and the surface area of the BAC was measured using a Micromeritics ASAP 2020 apparatus. The regenerated BAC was then degassed for 24 hours under vacuum at 350° C. and nitrogen physisorption and desorption were carried out at 77 K.

Example 3

A carrier gas comprising nitrogen from a nitrogen storage tank was fed to a bubbler containing an organic solvent comprising acetone to form a nitrogen-acetone vapor mixture. The flow rate of the carrier gas was maintained constant at 200 sccm using a mass flow controller. The nitrogen-acetone vapor mixture was then fed to the top of a glass-tube adsorption column packed with a bed of 2 g of aged BAC loaded with VOC, having a critical diameter, Dc, of 1.27 cm and a critical height, Hc, of 5.08 cm bed for 12 hours, during which time the regeneration column resided within a vertical furnace which maintained a constant temperature of 290° C. The BAC was removed from the packed bed column thereafter and the surface area of the carbon was measured using a Micromeritics ASAP 2020 apparatus. The regenerated BAC was then degassed for 24 hours under vacuum at 350° C. and nitrogen physisorption and desorption were carried out at 77 K.

Example 4

A carrier gas comprising nitrogen from a nitrogen storage tank was fed to a bubbler containing an organic solvent comprising carbon disulfide to form a nitrogen-carbon disulfide vapor mixture. The flow rate of the carrier gas was maintained constant at 200 sccm using a mass flow controller. The nitrogen-carbon disulfide vapor mixture was then fed to the top of a glass-tube adsorption column packed with a bed of 2 g of aged BAC loaded with VOC, having a critical diameter, Dc, of 1.27 cm and a critical height, Hc, of 5.08 cm bed for 12 hours, during which time the regeneration column resided within a vertical furnace which maintained a constant temperature of 290° C. The BAC was removed from the packed bed column thereafter and the surface area of the BAC was measured using a Micromeritics ASAP 2020 apparatus. The regenerated BAC was then degassed for 24 hours under vacuum at 350° C. and nitrogen physisorption and desorption were carried out at 77 K.

Example 5

A carrier gas comprising nitrogen from a nitrogen storage tank was fed to a bubbler containing an organic solvent comprising ethyl glycol to form a nitrogen-ethyl glycol vapor mixture. The flow rate of the carrier gas was maintained constant at 200 sccm using a mass flow controller. The nitrogen-ethyl glycol vapor mixture was then fed to the top of a glass-tube adsorption column packed with a bed of 2 g of aged BAC loaded with VOC, having a critical diameter, Dc, of 1.27 cm and a critical height, Hc, of 5.08 cm bed for 12 hours, during which time the regeneration column resided within a vertical furnace which maintained a constant temperature of 290° C. The BAC was removed from the packed bed column thereafter and the surface area of the BAC was measured using a Micromeritics ASAP 2020 apparatus. The regenerated BAC was then degassed for 24 hours under vacuum at 350° C. and nitrogen physisorption and desorption were carried out at 77 K.

Example 6

A carrier gas comprising nitrogen from a nitrogen storage tank was fed to a bubbler containing an organic solvent comprising dimethyl formamide to form a nitrogen-dimethyl formamide vapor mixture. The flow rate of the carrier gas was maintained constant at 200 sccm using a mass flow controller. The nitrogen-dimethyl formamide vapor mixture was then fed to the top of a glass-tube adsorption column packed with a bed of 2 g of aged BAC loaded with VOC, having a critical diameter, Dc, of 1.27 cm and a critical height, Hc, of 5.08 cm bed for 12 hours, during which time the regeneration column resided within a vertical furnace which maintained a constant temperature of 290° C. The BAC was removed from the packed bed column thereafter and the surface area of the BAC was measured using a Micromeritics ASAP 2020 apparatus. The regenerated BAC was then degassed for 24 hours under vacuum at 350° C. and nitrogen physisorption and desorption were carried out at 77 K.

Example 7

A carrier gas comprising nitrogen from a nitrogen storage tank was fed to a bubbler containing an organic solvent comprising methanol to form a nitrogen-methanol vapor mixture. The flow rate of the carrier gas was maintained constant at 200 sccm using a mass flow controller. The nitrogen-methanol vapor mixture was then fed to the top of a glass-tube adsorption column packed with a bed of 2 g of aged BAC loaded with VOC, having a critical diameter, Dc, of 1.27 cm and a critical height, Hc, of 5.08 cm bed for 12 hours, during which time the regeneration column resided within a vertical furnace which maintained a constant temperature of 290° C. The BAC was removed from the packed bed column thereafter and the surface area of the BAC was measured using a Micromeritics ASAP 2020 apparatus. The regenerated BAC was then degassed for 24 hours under vacuum at 350° C. and nitrogen physisorption and desorption were carried out at 77 K.

Example 8

A carrier gas comprising nitrogen from a nitrogen storage tank was fed to a bubbler containing an organic solvent comprising tetrahydrofuran to form a nitrogen-tetrahydrofuran vapor mixture. The flow rate of the carrier gas was maintained constant at 200 sccm using a mass flow controller. The nitrogen-tetrahydrofuran vapor mixture was then fed to the top of a glass-tube adsorption column packed with a bed of 2 g of aged BAC loaded with VOC, having a critical diameter, Dc, of 1.27 cm and a critical height, Hc, of 5.08 cm bed for 12 hours, during which time the adsorption column resided within a vertical furnace which maintained a constant temperature of 290° C. The BAC was removed from the packed bed column thereafter and the surface area of the BAC was measured using a Micromeritics ASAP 2020 apparatus. The regenerated BAC was then degassed for 24 hours under vacuum at 350° C. and nitrogen physisorption and desorption were carried out at 77 K.

Figure 2:
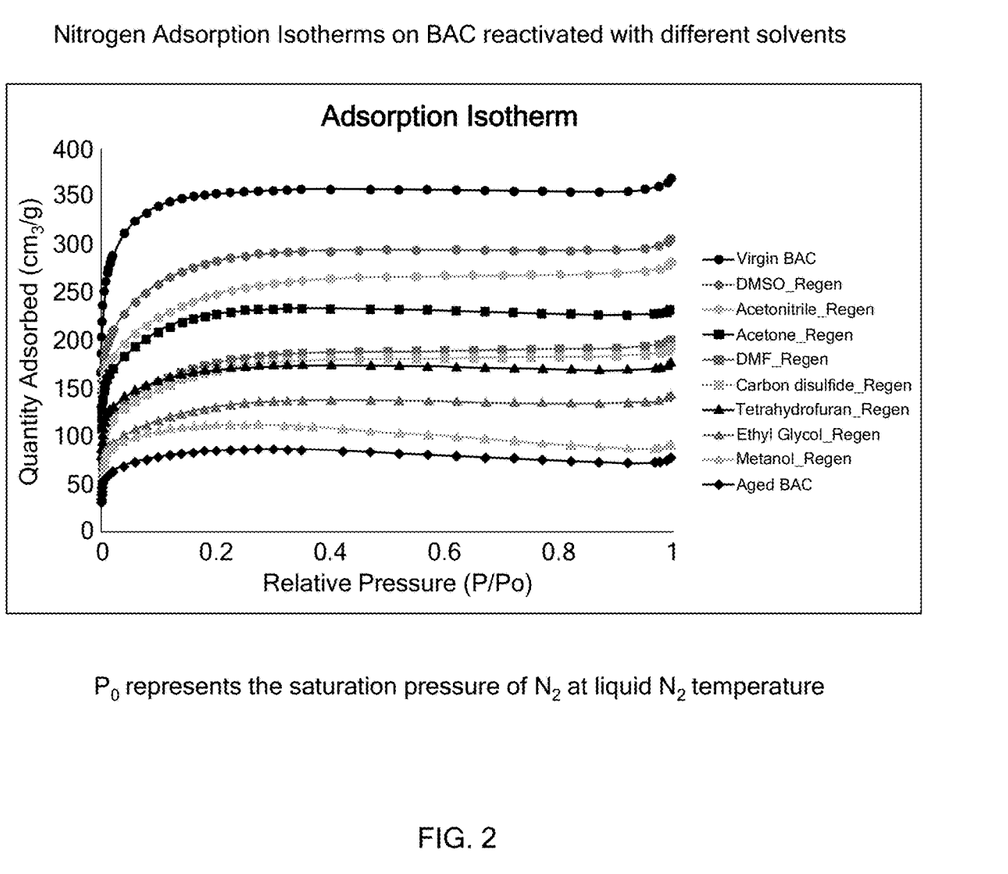
FIG. 2 is a graph of nitrogen adsorption isotherms of BAC reactivated according to Examples 1-8, virgin BAC, and aged BAC of the present disclosure.

Referring to FIG. 2, nitrogen adsorption isotherms of BAC regenerated according to Examples 1 through 7 above are shown. In addition to the examples, nitrogen adsorption isotherms of virgin BAC and untreated aged BAC loaded with VOC are also shown. Notably, the BAC of Example 1, which was treated with dimethyl sulfoxide, attained adsorption levels similar to that of virgin BAC.

Adsorption isotherms occur when temperature is kept constant while adsorption and desorption rates are at equilibrium. Because the temperature is kept constant, equilibrium depends only upon pressure, and the quantity of adsorbate adsorbed over different pressures is measurable and can be used as a representative model of adsorbent capacity of the adsorbate. Adsorption isotherms can therefore be used to model the surface area and pore volume of an adsorbent, which are directly related to determining the adsorption capacity of the adsorbent.

Using the isotherm data from FIG. 2 and applying the Brunauer-Emmett-Teller theory equation in the relative pressure (P/Po) range of from 0.05 to 0.20, the surface area of the BAC of the aforementioned examples were calculated, along with the surface area of the virgin BAC and untreated aged BAC samples loaded with VOC. The micropore volume was determined using the Dubinin-Astakhov equation. Table 1 below shows the calculated surface areas of the BAC of the Examples, virgin BAC, and aged BAC:

TABLE 1

| Sample | BET Surface area (m²/g) | Pore volume (cm³/g) |
|---|---|---|
| Virgin BAC | 1194.5 | 0.582 |
| Aged BAC treated with DMSO | 955.6 | 0.473 |
| Aged BAC treated with Acetonitrile t | 900.3 | 0.456 |
| Aged BAC treated with Acetone | 766.9 | 0.360 |
| Aged BAC treated with Dimethyl Formamide | 607.4 | 0.311 |
| Aged BAC treated with Carbon disulfide t | 597.8 | 0.298 |
| Aged BAC treated with Tetrahydrofuran | 573.5 | 0.273 |
| Aged BAC treated with Ethyl glycol t | 430.9 | 0.222 |
| Aged BAC treated with Methanol t | 313.2 | 0.151 |
| Aged BAC | 285.1 | 0.119 |

Based on these measurements, the aged BAC samples loaded with VOCs exposed to the processes according to the present disclosure had their capacities returned to as high as about 70% of original capacity.

Moreover, because the aged BAC samples loaded with VOCs can be regenerated at a much lower temperature as opposed to conventional regeneration techniques, substantially less mechanical stress is acted upon the BAC. Without being bound to any particular theory, it is believed this results in less deformity of the BAC during regeneration such that BAC can be regenerated indefinitely.

Further, the regeneration process according to the present disclosure negates the need for occasional off-site rotary kiln regeneration, which, as noted above, means BAC is not exposed to such extreme mechanical and thermal stresses that can irrevocably deform BAC to the point of the BAC being rendered inoperable. The conventional BAC regeneration process via rotary kiln is generally performed by a third party off-site, causing significant downtime when the BAC is unavailable for adsorbing VOCs in a paint shop. According to the present disclosure, this downtime can be eliminated, with significant cost savings, as BAC does not need to be shipped to an off-site rotary kiln regeneration facility.

Figure 3:
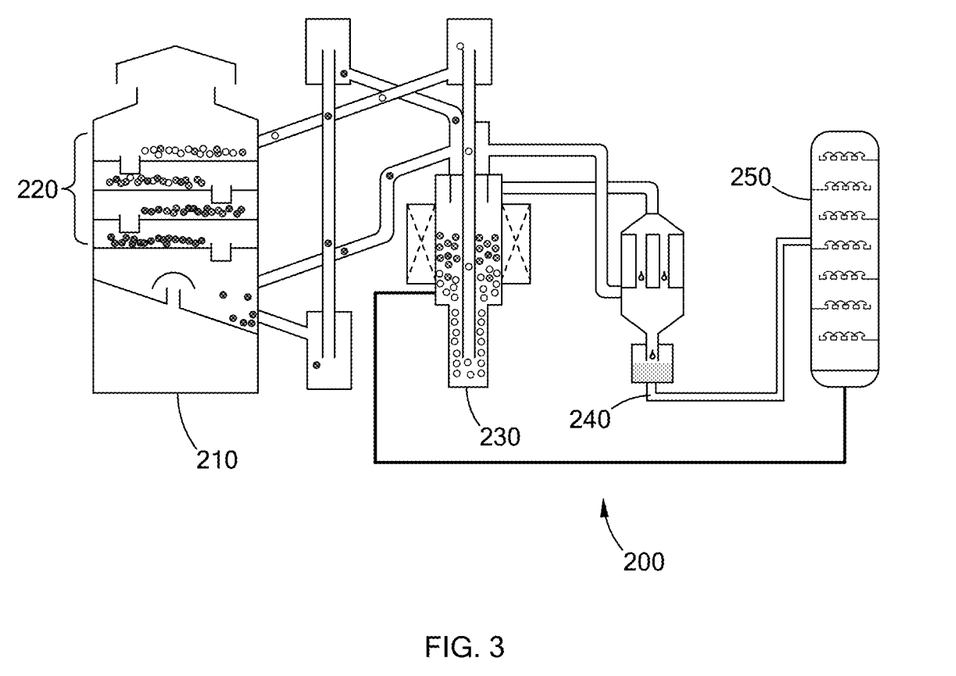
FIG. 3 is a diagrammatic view of a fluidized carbon bead system according to the teachings of the present disclosure.

Referring to FIG. 3, a large-scale fluidized carbon bead system 200 with in-line organic solvent regeneration capability according to the present disclosure is shown. The system 200 includes an adsorber 210 (such as an adsorber unit or adsorption tower). VOC laden air is pumped into adsorber 210, where a fluidized adsorption bed 220 comprising BAC adsorbs VOCs. According to a variation, the adsorber 210 is held at a temperature of greater than or equal to about 5° C. to less than or equal to about 40° C. According to yet another variation, the adsorber 210 is held at a temperature of greater than or equal to about 40° C. to less than or equal to about 80° C.

BAC loaded with VOCs are transferred to desorber 230 (e.g., a desorption unit, desorption column, desorption tower, or the like), where the BAC is exposed to a vapor-phase stream of the organic solvent that removes accumulated VOCs from the BAC. To obtain the vapor-phase stream of the organic solvent, a flow of carrier gas (e.g., gaseous nitrogen) is bubbled through a saturator, which may be attached to the desorber 230, filled with a liquid organic solvent at a temperature of about 25° C. The vapor-phase stream of the organic solvent is sent for an adequate period of time to the desorption desorber 230 containing a packed flowing bed of VOC-laden BAC. The desorber 230 may be maintained at a temperature of about the boiling point of the organic solvent. The vapor-phase stream of the organic solvent entering the desorber 230 comes quickly into thermal equilibrium with a packed flowing bed of VOC-laden BAC. Under these conditions, the vapor-phase stream of the organic solvent weakens the strength of adherence between the VOC molecules and the BAC, thereby facilitating desorption of VOC molecules from the BAC. The desorbed VOC molecules along with organic solvent vapors are then swept away by the carrier gas. Virtually complete removal of the VOC molecules from the BAC can accordingly be achieved by passing the vapor-phase stream of the organic solvent through the desorber 230 for an adequate time without creating heel accumulation in the BAC. The time required depends on the amount of BAC and how laden the BAC is with VOC, and accordingly may be shortened by increasing the temperature of the saturator sending the vapor-phase steam of the organic solvent to the desorber 230 so that a higher concentration of the organic solvent is sent to the desorber 230. In this manner, the BAC is regenerated and may then be returned to the adsorption bed 220 of the adsorber 210.

According to a variation, to obtain adequate desorption of VOCs from BAC, the desorber 230 may be held at a temperature of greater than or equal to about 290° C. According to a variation, the desorber unit 230 may be held at a temperature of greater than or equal to about 280° C. to less than or equal to about 350° C.

According to a variation, the vapor-phase stream of the organic solvent is a nitrogen-dimethyl sulfoxide vapor mixture. According to another variation, the vapor-phase stream of the organic solvent is a nitrogen-acetonitrile vapor mixture. According to other such variations, the vapor-phase stream of the organic solvent is a nitrogen-acetone vapor mixture. According to other such variations, the vapor-phase stream of the organic solvent is a nitrogen-carbon disulfide vapor mixture. According to other such variations, the vapor-phase stream of the organic solvent is a nitrogen-ethyl glycol vapor mixture.

According to some variations, the vapor-phase stream of the organic solvent is sent to the desorber unit 230 for about a three-hour period.

The organic solvent of the vapor-phase stream of the organic solvent may be recovered by separating out the VOCs. First, the liquid phase, containing the organic solvent and VOCs, is condensed out of the carrier gas via a condenser 240 (such as in a knockout drum). The liquid phase is transferred to a distillation unit 250 (e.g., any of a fractional, steam, azeotropic, extractive, and vacuum distillation tower or distillation column), where the VOCs are extracted from the organic solvent by taking advantage of the fact that the organic solvent has a higher boiling point than any of the VOCs in the liquid phase mixture. More specifically, the distillation unit 250 is held at a temperature sufficient to evaporate VOCs from the VOC laden stream while leaving the organic solvent in liquid form. According to a variation, the distillation unit 250 may be held in a temperature of less than or equal to about 171° C. to ensure the organic solvent does not evaporate with the VOCs. According to another variation, the distillation unit 250 may be held at a temperature of less than or equal to about 175° C. The temperature of distillation unit 250 may therefore depend on the organic solvent selected. The organic solvent distillate may be recovered from the bottom of the distillation unit 250 and reused an indefinite number of times in the desorber 230.

Suitable organic solvents are those that exhibit high dielectric constants and high boiling points. One particularly suitable organic solvent is dimethyl sulfoxide (DMSO), which has a dielectric constant of 46.7 Farad/meter and a boiling point of 189° C. But it is believed that other organic solvents, such as those having dielectric constants in the range of 7 to 50 and boiling points in the range of 50° C. to 250° C. may also operate sufficiently well to remove VOC from BAC. Appropriate organic solvents are those that exhibit adequate miscibility with alcohols, are readily soluble in most organic solvents, have a dielectric constant high enough to extract VOCs from BAC, and have a boiling point sufficiently higher than VOCs such that distillation is readily achievable. By way of example, when DMSO is used as the organic solvent, the distillation unit 250 may be held at a temperature of about 180° C. during distillation. Effective separation of the organic solvent from the VOCs is advantageous for recycling the solvent back into the desorber 230. Other suitable organic solvents include acetonitrile, acetone, carbon disulfide, and ethyl glycol.

Without wishing to be bound by theory, it is believed that an operational unit for use in a large-scale painting facility (e.g., a vehicle painting facility), an FCBS may have on the order of 1,360 kg of BAC to provide a timely feedback system for regenerating BAC laden with VOCs with a not unacceptable amount of downtime for regeneration. Theoretically, such an amount of BAC could adsorb 470 kg of VOCs. To remove this amount of VOCs from the BAC, 136 kg of organic solvent would be required. In practical operation the BAC is not fully loaded with VOCs, and thus shorter times and smaller amounts of organic solvent may be sufficient. Further, because the VOC molecules are recovered in this process in liquid form, they may be directly used as fuel to contribute to the heat demands of the process, thereby significantly and further reducing operating costs.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Specially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of treating beaded steam-activated carbon loaded with volatile organic compounds (VOC) of a fluidized carbon bead system with an organic solvent comprising:
    passing a vapor-phase stream of the organic solvent comprising a carrier gas and the organic solvent over VOC-loaded, beaded steam-activated carbon to extract at least a portion of the VOC from the beaded steam-activated carbon to regenerate the beaded steam-activated carbon;
    condensing the organic solvent and the VOC out of the carrier gas of the vapor-phase stream of the organic solvent to separate the carrier gas from the organic solvent and the VOC;
    distilling the VOC to separate the organic solvent and the VOC; and
    transferring the regenerated beaded steam-activated carbon to an adsorber.

2. The method according to claim 1, wherein the organic solvent is selected from the group consisting of dimethyl sulfoxide, acetonitrile, acetone, demiethyl formamide, carbon disulfide, tetrahydrofuran, and ethyl glycol.

3. The method according to claim 1, wherein the organic solvent is dimethyl sulfoxide.

4. The method according to claim 1, wherein the regenerated beaded steam-activated carbon exhibits a capacity of greater than or equal to about 70% of the capacity of virgin beaded steam-activated carbon.

5. The method according to claim 1, wherein the organic solvent further comprises a vapor-phase stream of organic solvent comprising a mixture comprising the vapor-phase stream of organic solvent and a carrier gas.

6. The method according to claim 5, wherein the carrier gas comprises nitrogen gas.

7. The method according to claim 1, wherein the organic solvent is recovered from a distillation unit and introduced into a desorber for reuse.

8. A method of treating steam-activated carbon loaded with volatile organic compounds (VOC) of a fluidized steam-activated carbon system with an organic solvent comprising:
- passing a vapor-phase stream of the organic solvent comprising a carrier gas and the organic solvent over VOC-loaded, steam-activated carbon to extract at least a portion of the VOC from the steam-activated carbon to obtain regenerated steam-activated carbon;
- condensing the organic solvent and the VOC out of the carrier gas of the vapor-phase stream of the organic solvent to separate the carrier gas from the organic solvent and the VOC;
- distilling the organic solvent to separate the organic solvent from the VOC; and
- transferring the regenerated steam-activated carbon to an adsorber.

9. The method according to claim 8, wherein the organic solvent is selected from the group consisting of dimethyl sulfoxide, acetonitrile, acetone, dimethyl formamide, carbon disulfide, tetrahydrofuran, and ethyl glycol.

10. The method according to claim 8, wherein the organic solvent is dimethyl sulfoxide.

11. The method according to claim 8, wherein the steam-activated carbon is selected from at least one of the group consisting of beaded steam-activated carbon, pellet-shaped steam-activated carbon, and extrudates of steam-activated carbon.

12. The method according to claim 8, wherein the regenerated beaded steam-activated carbon exhibits a capacity of greater than or equal to about 70% of the capacity of virgin beaded steam-activated carbon.

13. The method according to claim 8, wherein the organic solvent further comprises a vapor-phase stream of organic solvent comprising a mixture comprising the vapor-phase stream of organic solvent and a carrier gas.

14. The method according to claim 13, wherein the carrier gas comprises nitrogen gas.

15. The method according to claim 8, wherein the organic solvent is recovered from a distillation unit and introduced into a desorber for reuse.

16. A method of treating beaded steam-activated carbon loaded with volatile organic compounds (VOC) of a fluidized carbon bead system with dimethyl sulfoxide comprising:
- passing a vapor-phase stream of the dimethyl sulfoxide comprising a carrier gas and the dimethyl sulfoxide over VOC-loaded, beaded steam-activated carbon to extract at least a portion of the VOC from the beaded steam-activated carbon to obtain regenerated beaded steam-activated carbon;
- condensing the dimethyl sulfoxide and the VOC out of the carrier gas of the vapor-phase stream of the dimethyl sulfoxide to separate the carrier gas from the dimethyl sulfoxide and the VOC;
- distilling the dimethyl sulfoxide to separate the dimethyl sulfoxide from the VOC; and
- transferring the regenerated beaded steam-activated carbon to an adsorber.

17. The method according to claim 16, wherein the regenerated beaded steam-activated carbon exhibits a capacity of greater than or equal to about 70% of the capacity of virgin beaded steam-activated carbon.

18. The method according to claim 16, wherein the dimethyl sulfoxide further comprises a vapor-phase stream of dimethyl sulfoxide comprising a mixture comprising the vapor-phase stream of dimethyl sulfoxide and a carrier gas.

19. The method according to claim 18, wherein the carrier gas comprises nitrogen gas.

20. The method according to claim 16, wherein the dimethyl sulfoxide is recovered from a distillation unit and introduced into a desorber for reuse.

\* \* \* \* \*